UNITED STATES PATENT OFFICE.

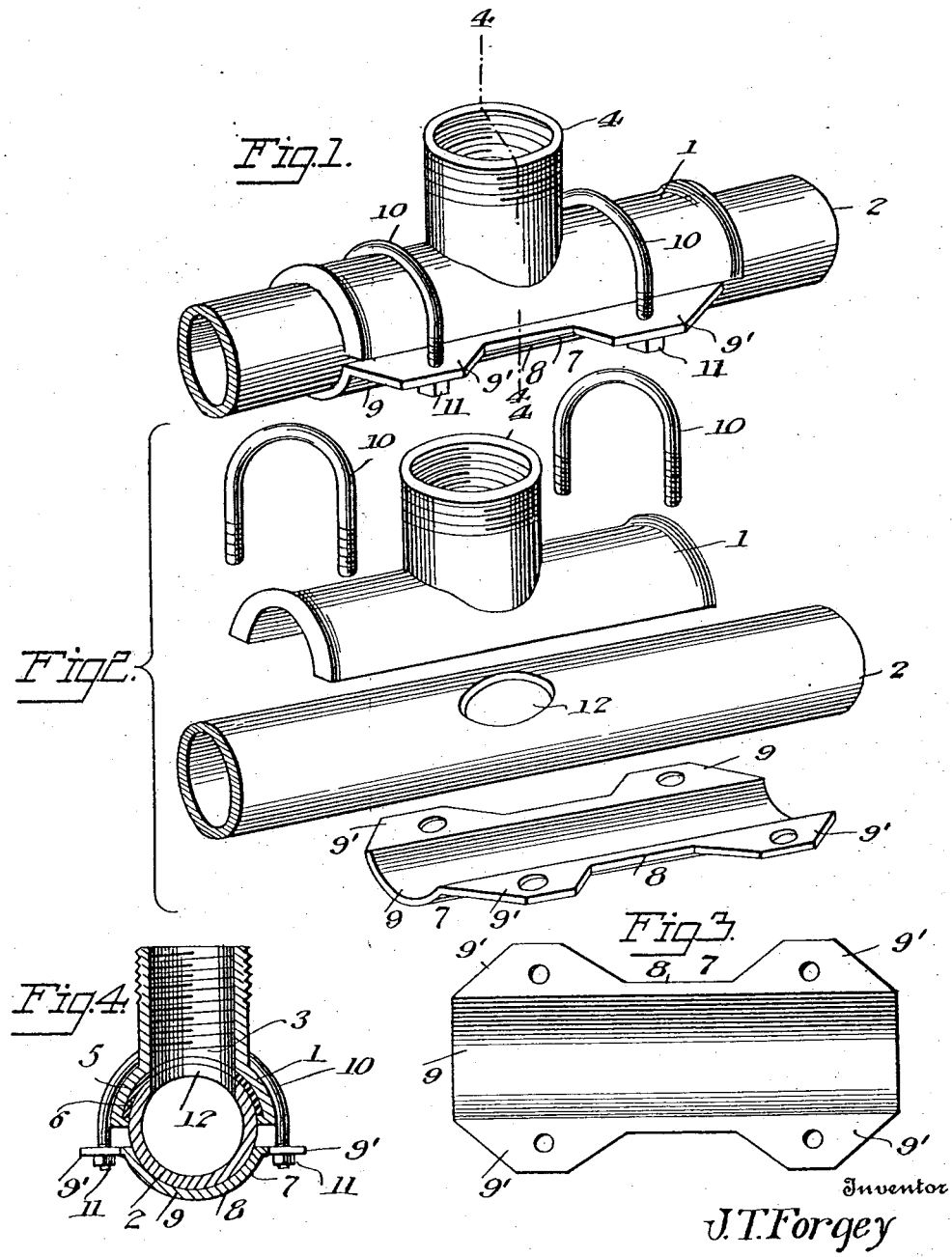

JOHN T. FORGEY, OF WELLSVILLE, KANSAS.

PIPE CONNECTION.

1,162,595.  Specification of Letters Patent.  Patented Nov. 30, 1915.

Application filed December 27, 1913. Serial No. 809,043.

*To all whom it may concern:*

Be it known that I, JOHN T. FORGEY, a citizen of the United States, residing at Wellsville, in the county of Franklin and State of Kansas, have invented new and useful Improvements in Pipe Connections, of which the following is a specification.

The invention relates to a pipe connection designed to be utilized as a T-connection and constructed with a view to permitting the usual branch pipe coupling without cutting or dividing the main pipe.

The main object of the present invention is the provision of a semi-cylindrical coupling member having an offset connection, and a saddle adapted to secure the member in fixed relation with the main pipe with the offset of said members in alinement with the opening formed in the pipe, whereby for all effective purposes the main pipe is provided with a T-connection without necessitating the division or separation of the main pipe.

The invention in the preferred form of details will be described in the following specification, reference being had particularly to the accompanying drawings, in which:—

Figure 1 is a perspective view illustrating the application of the improved connection. Fig. 2 is a perspective view of the various parts of the connection shown in separated position. Fig. 3 is a bottom plan view of the coupling member. Fig. 4 is a section on line 4—4 of Fig. 1.

Referring particularly to the accompanying drawings, the improved connection comprises what I term a coupling member including a semi-cylindrical shell 1 having an interior diameter corresponding to the exterior diameter of the pipe 2 with which the member is to coöperate. The member is formed with an opening 3 and with an offset interiorly and exteriorly threaded sleeve 4 registering with the opening. The interior surface of the member 1 is formed with a recess 5 to receive a packing strip 6, the strip surrounding the opening and serving as a packing intermediate the member 1 and pipe with which the member coöperates.

A saddle 7 is used in connection with the coupling comprising a metallic plate 8 having a rounded longitudinally extending central portion 9 to receive the lower portion of the pipe to which the connection is to be made, said plate including offset ears 9 which receive threaded terminals of U-shape hooks 10, the latter overlying and bearing upon the outer surface of the member 1. The terminals of the hooks 10 beyond the ears receive the usual clamp nuts 11, whereby said saddle plate and coupling member may be drawn into intimate contact with the pipe to which connection is to be made. In providing the branch pipe for which the coupling is designed, the main pipe 2 is formed with an opening 12 at a desired point therein and the shell 1 applied so that the opening 3 therein registers with said opening 12. When the saddle is applied a fluid tight connection between the shell and pipe is provided for while the sleeve 4 permits the connection of the branch pipe in the usual manner.

The improved T-connection is particularly advantageous where it is undesirable to cut the main pipe to insert the usual T, as by the use of the improved connection all that is necessary is to form an opening in the main pipe. Of course the improved T-connections are to be made in any and all sizes for coöperation with the pipes of any and all diameters, and in this connection it is of course understood that the material of which the various parts are to be constructed is not important so long as it is of necessary qualifications, whereby permitting the use of all materials.

What is claimed is:—

A T-connection for pipes formed with a lateral opening, said connection comprising a complete pipe portion adapted to encircle the said pipe for a material part of the length thereof, said pipe portion being formed in sections, one section including a shell of approximately semi-cylindrical shape, the edges thereof having inturned flanges, the diameter of the shell slightly exceeding that of the pipe with which it coöperates, the inturned flanges forming margins to receive and support backing intermediate the shell and pipe, and a saddle coöperating with the shell to embrace the pipe beyond the shell, said saddle having radially disposed ears, and U-bolts encircling the shell and secured through the ears to the saddle, the shell being formed with a pipe projection to register with the opening in the pipe.

In testimony whereof I affix my signature in presence of two witnesses.

JOHN T. FORGEY.

Witnesses:
H. E. DE TOR,
ELSIE JOB.

Copies of this patent may be obtained for five cents each, by addressing the "Commissioner of Patents, Washington, D. C."